J. E. FAGET.
AUTOMOBILE BUMPER.
APPLICATION FILED AUG. 18, 1917.
1,299,315.
Patented Apr. 1, 1919.
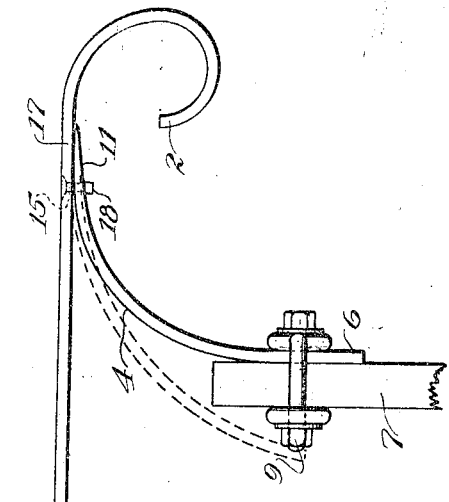
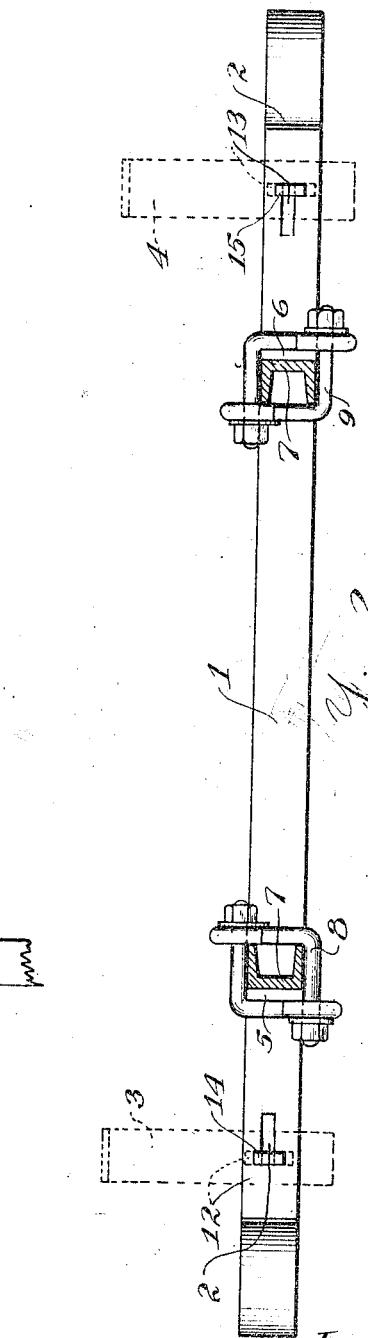
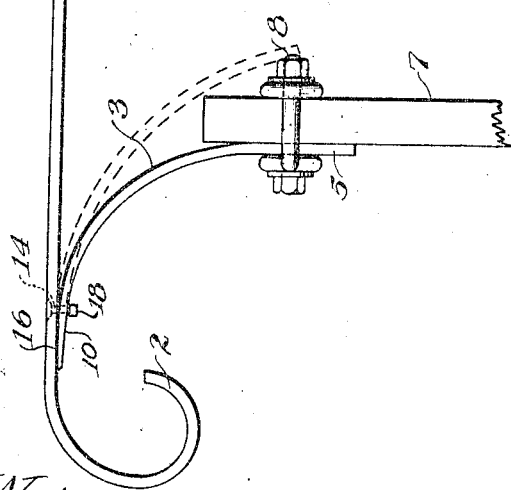
Witnesses
George C. Schultz
Wm. E. Anderson
Inventor
James E. Faget
By Rummler & Rummler
Attys

UNITED STATES PATENT OFFICE.

JAMES E. FAGET, OF CHICAGO, ILLINOIS, ASSIGNOR TO SOUTH SIDE BUICK SALES COMPANY, OF CHICAGO, ILLINOIS, A CORPORATION OF ILLINOIS.

AUTOMOBILE-BUMPER.

1,299,315.    Specification of Letters Patent.    Patented Apr. 1, 1919.

Application filed August 18, 1917. Serial No. 186,966.

*To all whom it may concern:*

Be it known that I, JAMES E. FAGET, a citizen of the United States of America, and a resident of Chicago, county of Cook, and State of Illinois, have invented certain new and useful Improvements in Automobile-Bumpers, of which the following is a specification.

The main objects of this invention are to provide an improved bumper for motor vehicles having an improved arrangement of parts whereby the bumper may be readily assembled and attached to the vehicle, or detached therefrom and dismantled; to provide improved means whereby the bumper bar is yieldingly supported on the arms by which it is attached to the vehicle; and to provide an improved formation of the bumper bar which will prevent the device from becoming entangled or caught in the fenders or wheels of passing vehicles.

An illustrative embodiment of this invention is shown in the accompanying drawings, in which—

Figure 1 represents a plan of my improved form of bumper, showing in full outline the relative positions of the parts when attached to the vehicle, and showing in dotted outline the disposition of the arms relative to the bar just before said arms are forced into position at the sides of the vehicle frame to which they are to be attached.

Fig. 2 shows a rear view of the bumper, the supporting arms being shown also in dotted outline in the vertical position for assembling and dismantling the structure.

In the construction shown in the drawings, the improved form of bumper comprises a single horizontal front member 1 and a pair of supporting arms 3 and 4.

The member 1 is formed of a single piece of comparatively heavy flat spring steel, the ends of which are curved rearwardly, inwardly, and forwardly, as shown at 2, so as to present a rounded portion which will tend to prevent the device from becoming entangled in the fenders or wheels of passing vehicles during traffic congestion.

The arms 3 and 4 are arcuate-shaped pieces of flat spring steel, which are adapted to have their respective rearward ends 5 and 6 rigidly secured to the front end of the chassis frame 7 of a vehicle and their forward ends attached to the bar 1. The attachment of the arms to the bar comprises a slot and pin arrangement, the outer ends 10 and 11 of the supporting arms having longitudinally disposed slots 12 and 13 formed therein, which are adapted to slidably embrace the shanks of pins or studs 14 and 15 respectively, which are rigidly mounted on the inner face of the bumper bar 1.

The studs 14 and 15 are provided with narrow elongated heads 18 disposed transversely of the bar 1 so as to be adapted to pass through the respective slots in the supporting arms when said arms occupy a vertical position transverse to the bar, and to engage and bear against the arms when they occupy a horizontal position in the plane of the bar 1 so as to hold the bar 1 in sliding engagement with said arms. This arrangement, as will be seen, permits easy and ready assembling and dismantling of the structure, and the device occupies a much smaller amount of space than other forms, when it is to be stored or shipped. The pin and slot arrangement also permits a bumper of this kind to be adjusted so as to fit practically every vehicle, even though the distance across the vehicle frames varies considerably.

The shape of the supporting arms 3 and 4 is such that when they are placed in position on the bar 1 preparatory to supporting the bumper on the vehicle, the rearward parts of the arms which are to be clamped to the vehicle frame are disposed at an angle to the frame, substantially as shown in dotted outline in Fig. 1 of the drawings. In order, therefore, to attach these arms to the vehicle frame, it is necessary to bow the rear ends outwardly until they are forced apart sufficiently to be placed in position to rest against the outer faces of the forward ends of the vehicle frame, as shown in full outline in Fig. 1. This causes the other or forward ends of the arms to press forwardly against the bar 1 at the points 16 and 17 and rearwardly against the heads 18 on the studs 14 and 15. Thus, the bar 1 is firmly but yieldingly held in sliding position on the arms 3 and 4. The bar cannot rattle or shift of itself, but in case it strikes an object with considerable force, it will bow inwardly, and the outer ends will tend to slide relative to the outer ends of the arms 3 and 4 so as to compensate for the bowing of said bar.

The clamps 8 and 9 which rigidly secure the supporting arms to the front end of the chassis frame may be of any desired form. Those shown in the accompanying drawings consist each of two right-angled bolts, said bolts having one end threaded to receive a nut and the other end being provided with an eyelet against which the nut on said one end of the other bolt bears.

The operation of the device, both as to assembling and dismantling and as to its use, is believed to be obvious from the foregoing description.

Although but one specific embodiment of this invention has been herein shown and described, it will be understood that numerous details of the construction shown may be altered or omitted without departing from the spirit of the invention as defined by the following claims.

I claim:

1. A vehicle bumper comprising a bar, a pair of arcuate-shaped spring-metal arms adapted to support said bar on a vehicle, the outer ends of said arms lying along and having limited sliding connection with said bar, said arms having their normal curvature such that after connection to said bar and before attachment to the vehicle the inner ends of said arms are disposed non-perpendicularly to said bar, said bar being adapted to be supported on the vehicle by having said arms flexed so that the inner ends thereof are shifted into positions substantially parallel to each other and perpendicular to said bar, and means for attaching the inner ends of said arms in said flexed positions to the vehicle frame.

2. A vehicle bumper comprising a bar, a pair of arcuate-shaped spring-metal arms adapted to support said bar on a vehicle, and means connecting said arms at their outer ends to said bar, said arms having their normal curvature such that after connection to said bar and before attachment to the vehicle the inner ends of said arms are disposed non-perpendicularly to said bar, said bar being adapted to be supported on the vehicle by having said arms flexed so that the inner ends thereof are shifted into positions substantially parallel to each other and perpendicular to said bar, whereupon said means are caused to clamp said bar against shifting on said arms, and means for attaching the inner ends of said arms in said flexed positions to the vehicle frame.

3. A vehicle bumper comprising a bar, a pair of arcuate-shaped arms adapted to support said bar at their outer ends and arranged for attachment to the framework of a vehicle by their other ends, and headed stud bolts connecting said arms to said bar at points inwardly from the ends of the said arms, the curvature of said arms being such that in attaching said bumper to the vehicle said arms must be bowed so as to cause the forward ends of said arms to press forwardly against said bar and to press rearwardly on said stud bolts, so as to clamp said bar against shifting on said arms.

4. A device of the class described, comprising a one-piece bar of spring metal, a pair of arcuate-shaped arms of spring metal for supporting said bar and adapted for attachment to the framework of a vehicle, said arms having slots formed in the forward ends thereof, and studs on said bar having elongated heads disposed transversely of said bar, said slots being adapted to be passed over the respective heads on said studs when said arms occupy a position transverse to said bar, whereupon said arms may be swung into the plane of said bar so as to permit said heads to retain said arms on said bar, the curvature of said arms being such that in attaching said device, said arms must be bowed so as to cause the forward ends of said arms to coact with said headed studs for yieldingly supporting said bar in position thereon.

5. A device of the class described, comprising a one-piece bar of spring metal, a pair of arcuate-shaped arms of spring metal for supporting said bar and adapted for attachment to the framework of a vehicle, said arms having slots formed in the forward ends thereof, and studs on said bar having elongated heads disposed transversely of said bar, said slots being adapted to be passed over the respective heads on said studs when said arms occupy a position transverse to said bar, whereupon said arms may be swung into the plane of said bar so as to permit said heads to retain said arms on said bar, the curvature of said arms being such that in attaching said device the inner ends of said arms must be bowed outwardly, thereby causing the forward ends of said arms to press forwardly against said bar and to press rearwardly on said heads.

Signed at Chicago this 14th day of August, 1917.

JAMES E. FAGET.